Figure 1:
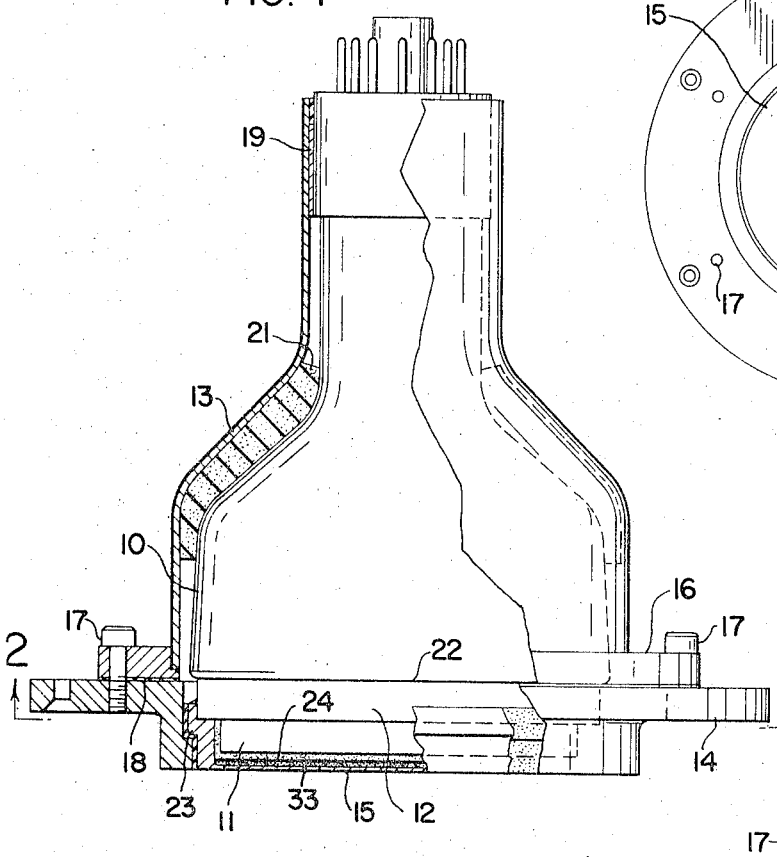
Figure 2:
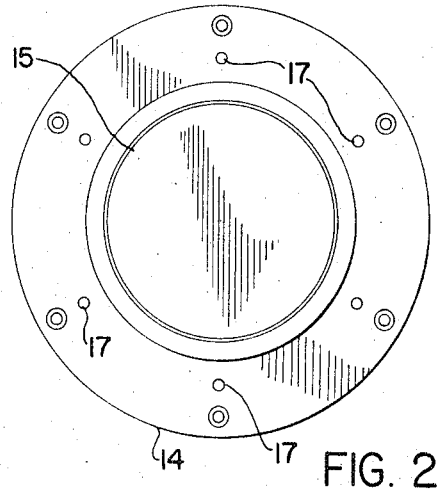
Figure 3:
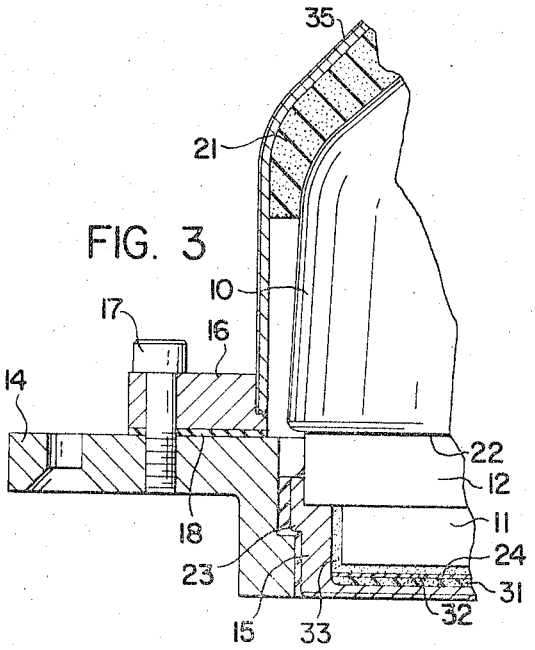
Figure 4:
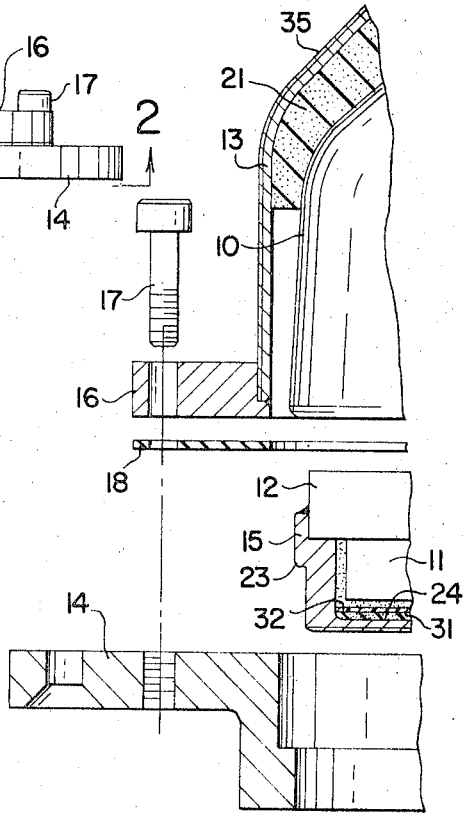

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 8, 1973

910 O.G. 408

T910,007
HOUSING FOR RADIATION DETECTOR

Harry Suscheck, Euclid, and Julious M. Menefee, Novelty, Ohio, assignors to Bicron Corporation, Newbury, Ohio

Filed Feb. 9, 1972, Ser. No. 224,660
Int. Cl. G01t *1/20*
U.S. Cl. 250—71.5 R
1 Sheet Drawing. 8 Pages Specification

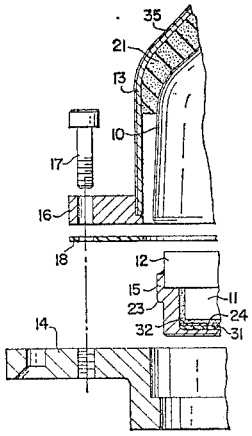

A metallic protective housing for a radiation detector or the like that includes a scintillation crystal for receiving short wave length radiation, such as gamma radiation, and converting it to a longer-wave-length, visible light image, a photomultiplier tube 10 for converting the visible light image to an electrical signal, and an optical window 12 interposed between the scintillation crystal 11 and the photomultiplier tube. The housing 13 supports the above components in assembled, optically aligned relation and has a layer of impervious chrome plating 35 deposited thereon to provide a surface that may be easily cleaned of any harmful radioactive material.

The accompanying drawing figure is an exploded fragmentary sectional view illustrating the above listed components of the housing and their manner of assembly.

May 8, 1973 H. SUSCHECK ET AL T910,007

HOUSING FOR RADIATION DETECTOR

Filed Feb. 9, 1972

INVENTOR.
HARRY SUSCHECK
JULIOUS M. MENEFEE

BY

McCoy, Greene & Howell

ATTORNEYS